United States Patent [19]
Van Brunt

[11] 4,072,949
[45] Feb. 7, 1978

[54] RANGE GATE WALK-OFF OF COMPRESSIVE RADAR

[75] Inventor: LeRoy B. Van Brunt, Fairfax, Va.

[73] Assignee: The United States of America as represented by the Secretary of the Navy, Washington, D.C.

[21] Appl. No.: 20,440

[22] Filed: Mar. 17, 1970

[51] Int. Cl.² ............................ G01S 7/38; H04K 3/00
[52] U.S. Cl. .................................................... 343/18 E
[58] Field of Search ...................................... 343/18 E

[56] References Cited
U.S. PATENT DOCUMENTS

| | | | |
|---|---|---|---|
| 3,048,794 | 8/1962 | Ares | 343/18 E |
| 3,113,268 | 12/1963 | Horak | 343/18 E |
| 3,258,771 | 6/1966 | Harpster | 343/18 E |
| 3,375,515 | 3/1968 | Novikoff | 343/18 E |
| 3,504,366 | 3/1970 | Tolles et al. | 343/18 E |

*Primary Examiner*—Malcolm F. Hubler
*Attorney, Agent, or Firm*—R. Sciascia; R. Beers; S. Sheinbein

[57] ABSTRACT

The invention involves an electronic countermeasure technique which is used against a pulse compression, random PRF, frequency diverse radar by stretching a pulse received from the radar before returning it. By progressively delaying the pulse until its delay is greater than the range gate of the radar, the return pulse to the radar is either blocked entirely or else it is received as a spurious, misleading echo.

7 Claims, 3 Drawing Figures

RANGE GATE WALK-OFF OF COMPRESSIVE RADAR

STATEMENT OF GOVERNMENT INTEREST

The invention described herein may be manufactured and used by or for the Government of the U.S. of America for governmental purposes without the payment of any royalties thereon or therefor.

BACKGROUND OF THE INVENTION

The present invention relates to electronic countermeasure techniques and more particularly to electronic countermeasure techniques which stretch out and distort a return pulse beyond the range gate of enemy compression pulse search radars so that radars will no longer produce accurate echo indications.

Range Gate Walk Off as previously accomplished by operational ECM systems utilizes an r-f memory system. This memory system is basically composed of a traveling wave tube and a delay device. The input pulse as received from the enemy equipment being jammed is detected and is used to gate ON the r-f memory loop, this loop normally operating with a gain of more than one so that the gating ON of this loop will permit a build up of oscillations. Once turned on, oscillations will build up at a gain peak of the loop. However, by turning on the loop only a fraction of the time it takes to build up to this preferred oscillation, the input signal frequency that is applied to the loop will be repeated by recirculating through the delay line and reamplification by the traveling wave tube. This essentially produces a stretched r-f pulse in the output corresponding to each r-f pulse at the input.

For the purposes of explanation here, the delay and input pulse width are equal. Certainly, an input pulse width which varies frequency within the pulse could not be walked off in this manner because the leading edge of the signal that is returned through the delay media would not be at the same frequency as the trailing edge of the input pulse. The output stretched waveform would not be frequency continuous.

Another disadvantage of such a memory loop for a range deception use against a radar which utilizes pulse compression is that the pulse width and delay media requirements are not compatible. R-f delays of about 0.5 microseconds are presently available with reasonable attenuations.

The present invention overcomes the faults and shortcomings of the above prior art systems and will successfully walk off the range gate of a system such as one which utilizes pulse compression, a random pulse rate frequency, pulse-to-pulse frequency hopping, and monopulse technique for angle tracking. The present invention as will be disclosed hereinafter will have the following input-output characteristics:

| Radio Frequency Input Signal Characteristics | |
| --- | --- |
| PRF: | 216 PPS ±10% random |
| Pulsewidth: | 27 us |
| Linear In-Pulse Frequency Variation: | 1 mc (either + or −) |
| Pulse-to-Pulse Frequency Hop: | ±100 mc random |
| Frequency: | 5600 − 5800 mcs |
| Pulse Train Modulation: | None |
| Radio Frequency Output Signal Characteristics | |
| PRf: | 216 PPS ±10% random |
| Pulsewidth: | 27 us |
| Linear In-Pulse Frequency Variation: | 1 mc (either + or −) |
| Pulse-to-Pulse Frequency Hop: | ±100 mc random |
| Frequency: | 5600 − 5800 mcs |
| Pulse Train Modulation: | None |
| Delay: | Each pulse delayed a controlled amount of time from the corresponding input pulse continuously from 0 − 50 us. |

An object of the present invention is the provision of an electronic countermeasure technique. Another object of the present invention is the provision of an ECM technique which can capture the range gate of a pulse compression radar system.

Still another object of the present invention is the provision of an ECM technique which can progressively delay the range gate of an enemy radar beyond the true target pulse.

Still another object of the present invention is the provision of an ECM technique which provides that the enemy radar has no return signal within its range gate.

Yet another object of the present invention is the provision of an ECM technique which can operate against a compressive, random PRF, frequency diverse radar.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
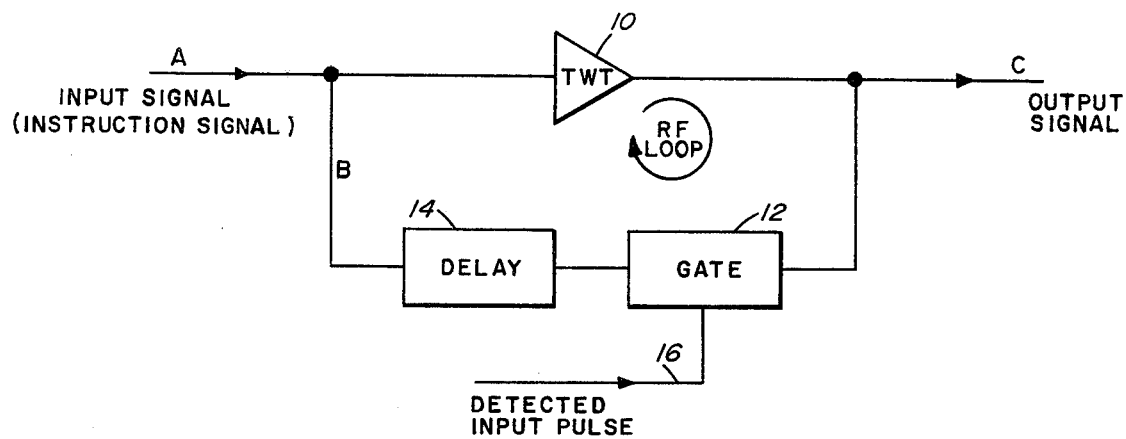
FIG. 1 shows a block diagram of a basic range gate walk off system.

Referring now to the drawings there can be seen in FIG. 1 a basic circuit diagram for a range gate walk off device. An input or instruction signal is applied at A where it passes through a traveling wave tube 10 and thence by a feedback circuit and gate means 12 and a delay 14 back to the input of traveling wave tube 10. A lead 16 is used to apply a detected input pulse from an enemy radar to gate means 12 which gates ON the r-f memory loop and produces an output signal at point C.

Figure 2:
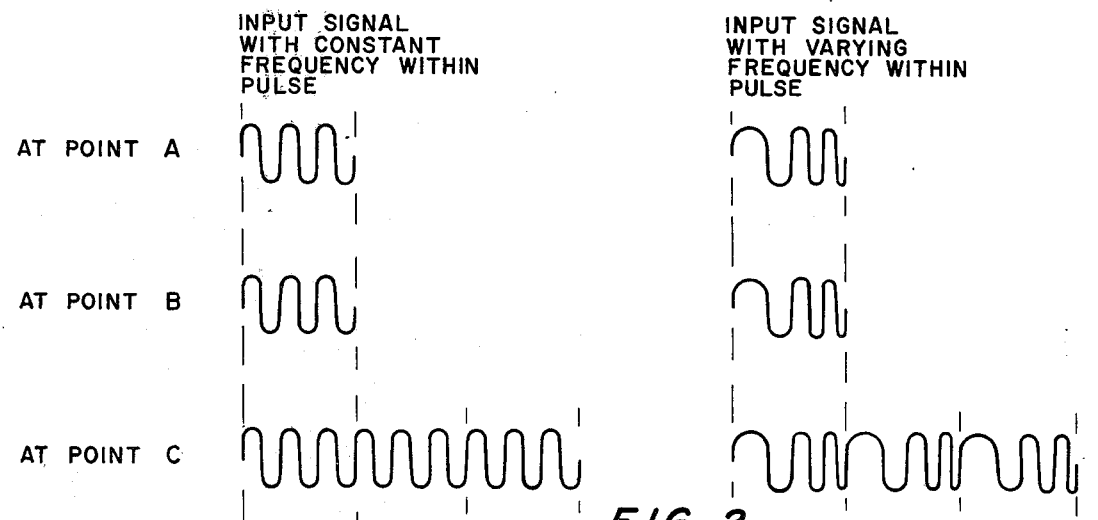
FIG. 2 shows sample wave forms as produced by the circuit of FIG. 1.

In FIG. 2 there are shown typical wave forms as would appear at points A, B, and C of FIG. 1. The waveforms in the column on the left hand side are those as would be produced by an input signal having a constant frequency within the pulse, while those in the right hand column are for a signal with a varying frequency within the pulse.

Figure 3:
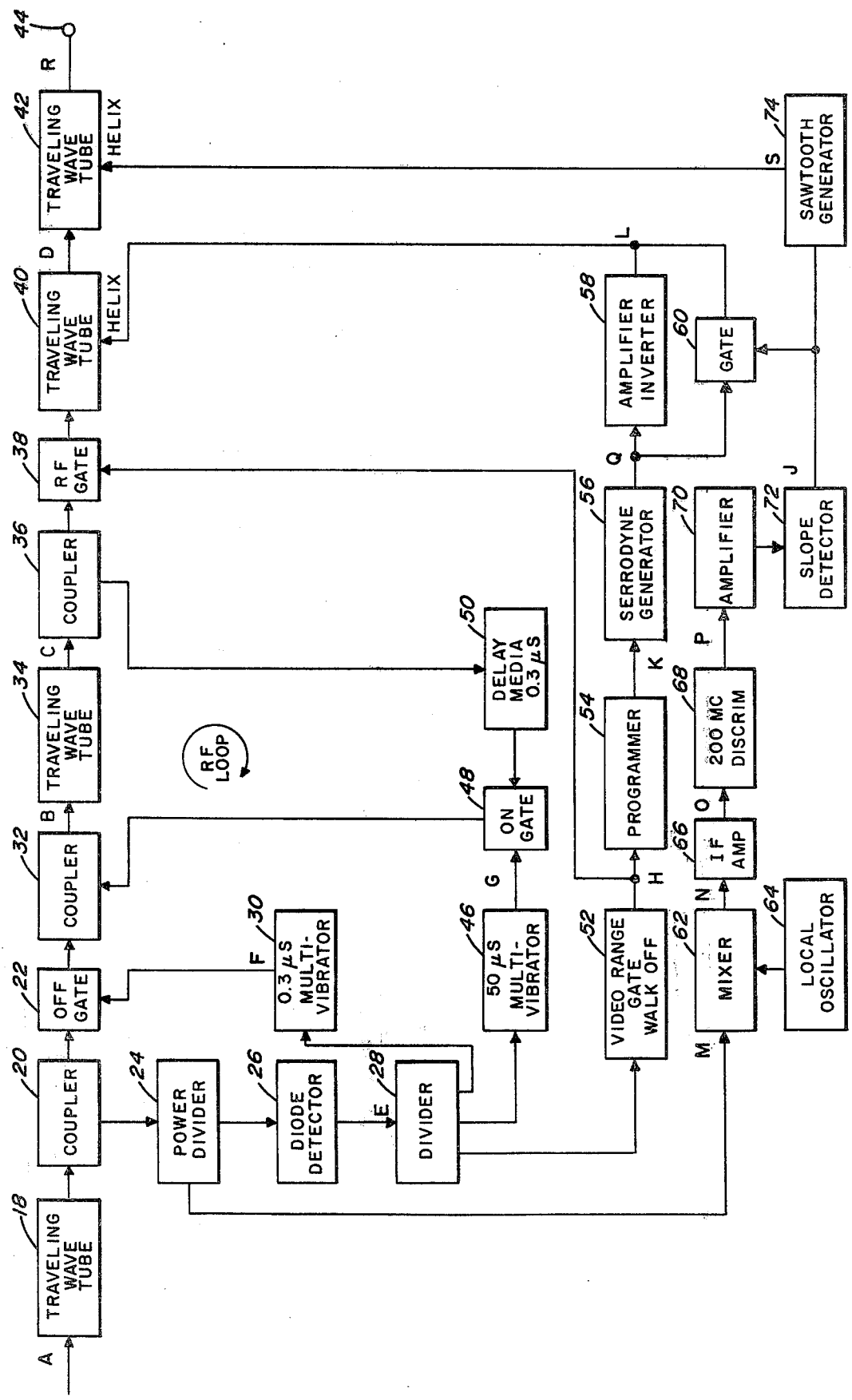
FIG. 3 shows a block diagram of the present invention.

In FIG. 3, which is a block diagram of the preferred embodiment of the invention, there is disclosed an input A which is connected to a traveling wave tube 18, the output of tube 18 being connected to a coupler 20 before being passed onto an OFF gate 22. A second output from coupler 20 leads to a power divider 24 and thence to a diode detector 26 before being applied to a divider 28. Divider 28 has three outputs, one of which leads to a 0.3 microsecond multivibrator 30 the output of which is applied as a second input to OFF gate 22.

From the output of OFF gate 22 the signal is applied to a coupler 32 before being applied to a second traveling wave tube 34. From traveling wave tube 34 the signal is applied in turn to a coupler 36, an r-f gate 38, a third traveling wave tube 40, to a fourth traveling wave tube 42 and thence to an output terminal 44.

A second output from divider 28 is applied to a 50 microsecond multivibrator 46 whose output is used as one of the inputs to an ON gate 48. One of the outputs of coupler 36 passes to a delay media 50 which has a 0.3 microsecond delay before its output is applied as a second input to gate 48, the output of gate 48 being applied as a second input to coupler 32.

The third output from divider 28 is applied to a video range gate walk off device 52, the output of this device being split between a programmer 54 and as another input to r-f gate 38. From programmer 54 the signal is passed on to a serrodyne generator 56 and thence to an amplifier inverter 58. Connected in parallel with amplifier inverter 58 there is a gate 60 which likewise is connected to the output of serrodyne generator 56, the output of amplifier inverter 58 and gate 60 being combined and applied to the traveling wave tube 40.

Looking back now at the beginning part of the circuit there can be seen that a second output from divider 24 is applied to a mixer 62 where this signal is hetrodyned with an output from a local oscillator 64 also connected to the mixer. Connected to the output of mixer 62 there is an IF amplifier 66 which in turn is connected to a 200 mcs discriminator 68, this in turn being connected to an amplifier 70 and then to a slope detector 72. The output of slope detector 72 is divided so that one portion is applied to gate 60 while the other portion is applied to a sawtooth generator 74. The output of sawtooth generator 74 is applied as another input to the fourth traveling wave tube 42.

Turning now to the operation of the device it will be observed that there is presented a traveling wave tube chain, consisting of four traveling wave tubes 18, 34, 40, and 42. The r-f input pulse train enters the system at point A. It is then amplified by the first traveling wave tube 18, is decoupled by coupler 20 and a portion of this signal is applied through power divider 24 to a diode detector.

A second output signal from coupler 20 is also fed to an r-f gate 22 and a second coupler 32 before entering the second traveling wave tube 34. The output of this traveling wave tube, as at point C, then goes through a coupler 36, an r-f gate 38, and into the last two traveling wave tubes 40 and 42 whose output is produced at output terminal 44 located at point R. The last two traveling wave tubes, 40 and 42, have isolated helices and will be serrodyned in this application. The word "serrodyne" means to frequency translate, and it is a process whereby a sawtooth waveform of proper amplitude, applied to the helix of a traveling wave tube will cause the output of the TWT to shift in frequency by an amount equal to the frequency of the applied sawtooth waveform. This process produces a single sideband suppressed carrier output.

The output of the diode detector 26, as at point E, goes to a power divider 28 which separates the signal into three separates signal paths. The first path goes to a 0.3 microsecond one shot multivibrator 30, which gates OFF the signal through the main system path by means of OFF gate 22. This means that at no time does the signal entering the second TWT 34 have a width any wider than 0.3 microseconds. The second power divider output activates a 50 microsecond one shot multivibrator 46. This gates ON the r-f memory loop by means of ON gate circuit 48, the r-f memory loop being composed of ON gate 48, coupler 32, TWT 34, coupler 36, and delay media 50. Since this r-f loop is designed with a gain of 10 db or thereabouts, oscillations will build up. However, during the 50 microseconds it is allowed on, 167 circulations of the input r-f pulse will take place, 167 is obtained by dividing 50 microseconds by 0.3 microseconds. At the end of 50 microseconds, the loop noise will have built up to such a point that further on-time of the system will not yield usable output because of the smallness of the signal-to-noise ratio. The output of the second TWT 34, a 50 microsecond pulse, is then fed through another r-f gate 38.

The third output from power divider 28 detects the true pulse width of the input signal and applies it to a Video Range Gate Walk Off Generator 52. This is shown as a box on the block diagram whose output is at point H. This range gate walk off box 52 contains circuitry of perhaps 20 transistors and is of the type of circuit that has been designed by a number of companies and will not be described herein. Its operation is that the video delay on a pulse-to-pulse basis of the input pulse train is successively delayed parabolically out to a maximum of 50 microseconds. This output signal is then applied to the r-f gate 38. Therefore, the output of this r-f gate 38 will be a fixed frequency equal to the frequency at the beginning, or the first 1% or so of the input pulse at A, whose pulse width is 27 microseconds, and whose successive pulse-by-pulse delay is being varied. This signal is then applied to the last two TWT's 40 and 42 for Serrodyning operations.

Another output at video range gate walk off circuit 52, at point H, goes to programmer 54, this unit being essentially a sweep generator which in turn controls the frequency of the serrodyne generator 56. During the 27 microsecond width of the pulse, the frequency of the signal at point Q varies linearly from 500 KC to 1500 KC. A 500 KC sawtooth period is 2 microseconds and a 1500 KC sawtooth period is 0.67 microseconds. Therefore about 20 sawtooths will be generated during the pulse ON time, and this represents a reasonable smoothness for the linear frequency variation. This signal from serrodyne generator 56 is applied either directly through the gate 60 or is inverted by inverter amplifier 58 and then is applied to the helix of the traveling wave tube 40 as shown at point L. Another sawtooth generator 74 is shown driving the helix of the output traveling wave tube 42. Sawtooth generator 74 is a fixed frequency generator and operates at 500 KC. This serrodynes with the inverse polarity to the serrodyning of the previous tube, (TWT 40), that is, the output of the third traveling wave tube 40 is a signal whose frequency varies from the input frequency + 500 KC to the input frequency + 1500 KC. By applying the second inverse serrodyne process the frequency of the output of the last traveling wave tube 42 varies from the input frequency to the input frequency + 1000 KC. If this double serrodyning process were not done the circuit will not work because of the time required to generate the low frequency sawtooths that would be required.

Going back to the input portion of the diagram again, there is an output from power divider 24, which is obtained from coupler 20, that goes to a mixer 62 at point M. The local oscillator 64 feeding mixer 62 operates at approximately 5900 mcs for the application described. This produces a signal in the range of 100–300 mcs depending on the input frequency of the pulse. Since the i-f amplifier 66 is designed for a 200 mcs bandwidth, all signals will be accepted. This is followed by a 200 mcs discriminator 68 which has a DC coupled output as at point P. At this stage an increasing sawtooth indicates a positive-going input frequency and a decreasing sawtooth indicates a negative-going input frequency. The signal from point P is then amplified by amplifier 70 and applied to a slope detector 72, the slope detector consisting of two differently biased transistors. Depending on which diode in slope detector 72 is activated first, the gate 60 will close and shut off traveling wave tube 40 and the polarity will be such that the signal frequency coming from TWT 42 will follow the input frequency variation. The slope detector 72 must also control the polarity of sawtooth generator 74 for the last TWT 42.

The operation of the block diagram for the present invention was described using a specific input signal. It should be noted however that many other combinations of input frequencies, pulse repetition frequencies, pulse widths, and chirp limits could be handled by proper choice of block diagram parameters.

From the above description of the structure and operation of the present invention it is obvious that there is presented herein an electronic countermeasure device which offers many improvements and advances over similar prior art devices. Thus, there is clearly disclosed an ECM technique that would capture the range gate of a pulse compression radar system, progressively delay the range gate out beyond the true target pulse, and turn off so that the radar has no signal in range gate causing a break lock. Range gate deception is an effective countermeasure technique and has been found to be most effective against enemy operations.

Obviously many modifications and variations of the present invention are possible in the light of the above teachings. It is therefore to be understood, that within the scope of the appended claims the invention may be practiced otherwise than as specifically described.

What is claimed is:

1. A range gate walk off device to be used as a countermeasure to radar reception, comprising:
   input terminal means for receiving enemy radar signals;
   a plurality of traveling wave tubes connected in series to receive, modify and amplify the signals;
   delay means and gating means connected in series with each other and in parallel with one of the traveling wave tubes to comprise an RF memory loop;
   detection means, connected to the gating means, for detecting the received signals and opening the gating means when a signal is received; and
   output terminal means for transferring the modified signal to another device.

2. The range gate walk off device of claim 1 wherein:
   the plurality of traveling wave tubes includes a first and a second traveling wave tube;
   an OFF gate is connected between the first and second traveling wave tubes; and
   a first one shot multivibrator is connected between said detection means and said OFF gate whereby the signal entering the second traveling wave tube will have a width determined by the period of said first multivibrator.

3. The range gate walk off device of claim 2 further including:
   a second one shot multivibrator connected to said detection means; and
   means connecting the second multivibrator to said gating means to turn on the RF memory loop so that oscillations will build up in the memory loop for a period determined by the period of the second multivibrator.

4. The range gate walk off device of claim 3 wherein:
   the plurality of traveling wave tubes includes a third traveling wave tube;
   a video range gate walk off generator is connected to said detection means to receive the detected true pulse width of the input signal, the generator operating to successively delay the input signal on a pulse to pulse basis; and
   an RF gate is connected between the second and third traveling wave tubes and connected to receive the output from the range gate walk off generator.

5. The range gate walk off device of claim 4 further including;
   a programmer sweep generator connected to receive the output of the range gate walk off generator;
   a serrodyne generator connected to receive the output of the programmer;
   an amplifier-inverter connected to receive the output of the serrodyne generator; and
   means connecting the output of the amplifier inverter with the helix of the third traveling wave tube whereby the output of the traveling wave tube varies in frequency as determined by the period of the serrodyne generator.

6. The range gate walk off device of claim 5 wherein the plurality of traveling wave tubes includes a fourth traveling wave tube connected to the third traveling wave tube.

7. The range gate walk off device of claim 6 further including;
   a coupler between the first traveling wave tube and the OFF gate;
   a power divider connected to receive one output from the coupler;
   a mixer connected to the power divider;
   a local oscillator connected to the mixer to heterodyne with the signal from the power divider;
   an IF amplifier connected to the output of the mixer;
   a discriminator connected to the IF amplifier;
   an amplifier connected to the discriminator;
   a slope detector connected to the amplifier;
   a sawtooth generator connected to the slope detector; and
   means connecting the output of the sawtooth generator with the helix of the fourth traveling wave tube so that the fourth traveling wave tube serrodynes at a frequency determined by the sawtooth generator and with an inverse polarity to the serrodyning of the third traveling wave tube.

* * * * *